United States Patent [19]
Dye et al.

[11] 3,871,230
[45] Mar. 18, 1975

[54] FLOW MEASURING APPARATUS

[75] Inventors: John F. Dye; William J. Binard, both of Barrington; Leonard R. Anglada, Arlington Heights, all of Ill.

[73] Assignee: The Kendall Company, Walpole, Mass.

[22] Filed: May 14, 1973

[21] Appl. No.: 360,214

[52] U.S. Cl. .................... 73/215, 128/2 F, 128/295
[51] Int. Cl. ................................................ G01f 1/00
[58] Field of Search ....... 73/215, 216, 428; 128/2 F, 128/275, 295

[56] References Cited
UNITED STATES PATENTS

| | | | |
|---|---|---|---|
| 963,150 | 7/1910 | Howell | 73/215 |
| 1,042,097 | 10/1912 | Englebright | 73/215 |
| 1,161,279 | 11/1915 | Anderson | 73/215 |
| 1,992,780 | 2/1935 | Skeats | 73/215 X |
| 2,012,601 | 8/1935 | Flood | 33/126.7 R |
| 2,165,705 | 7/1939 | Houser | 73/215 |
| 2,648,981 | 8/1953 | Drake, Jr. | 73/215 |
| 3,058,353 | 10/1962 | Irwin | 73/428 |
| 3,211,195 | 10/1965 | Porter | 141/331 X |
| 3,466,145 | 9/1969 | Duyne | 23/253 R |
| 3,488,855 | 1/1970 | Howe | 33/126.7 R |
| 3,527,251 | 9/1970 | Hagstrom et al. | 73/215 X |

FOREIGN PATENTS OR APPLICATIONS

| | | | |
|---|---|---|---|
| 94,707 | 5/1922 | Switzerland | 73/215 |
| 591,987 | 1/1934 | Germany | 73/215 |

*Primary Examiner*—Richard C. Queisser
*Assistant Examiner*—John P. Beauchamp
*Attorney, Agent, or Firm*—Powell L. Sprunger

[57] ABSTRACT

An apparatus for measuring the approximate peak flow rate of a liquid discharge having a hollow receptacle. The receptacle has an inlet port adjacent the upper end of the receptacle to receive the liquid discharge, and a compartment below the inlet port to receive the discharge passing through the inlet port. The receptacle also has a channel adjacent the compartment, and an upright wall in the receptacle separating the compartment from the channel. The wall has opening means communicating between the compartment and the channel to permit passage of liquid from the compartment to the channel as the liquid collects in the compartment. The receptacle includes means for indicating the maximum height of liquid collected in the compartment during the discharge to determine the approximate peak flow rate of the liquid discharge. The liquid passes from the channel to a container for collection therein, and the total volume of the discharge may also be determined from indicia on the container.

23 Claims, 5 Drawing Figures

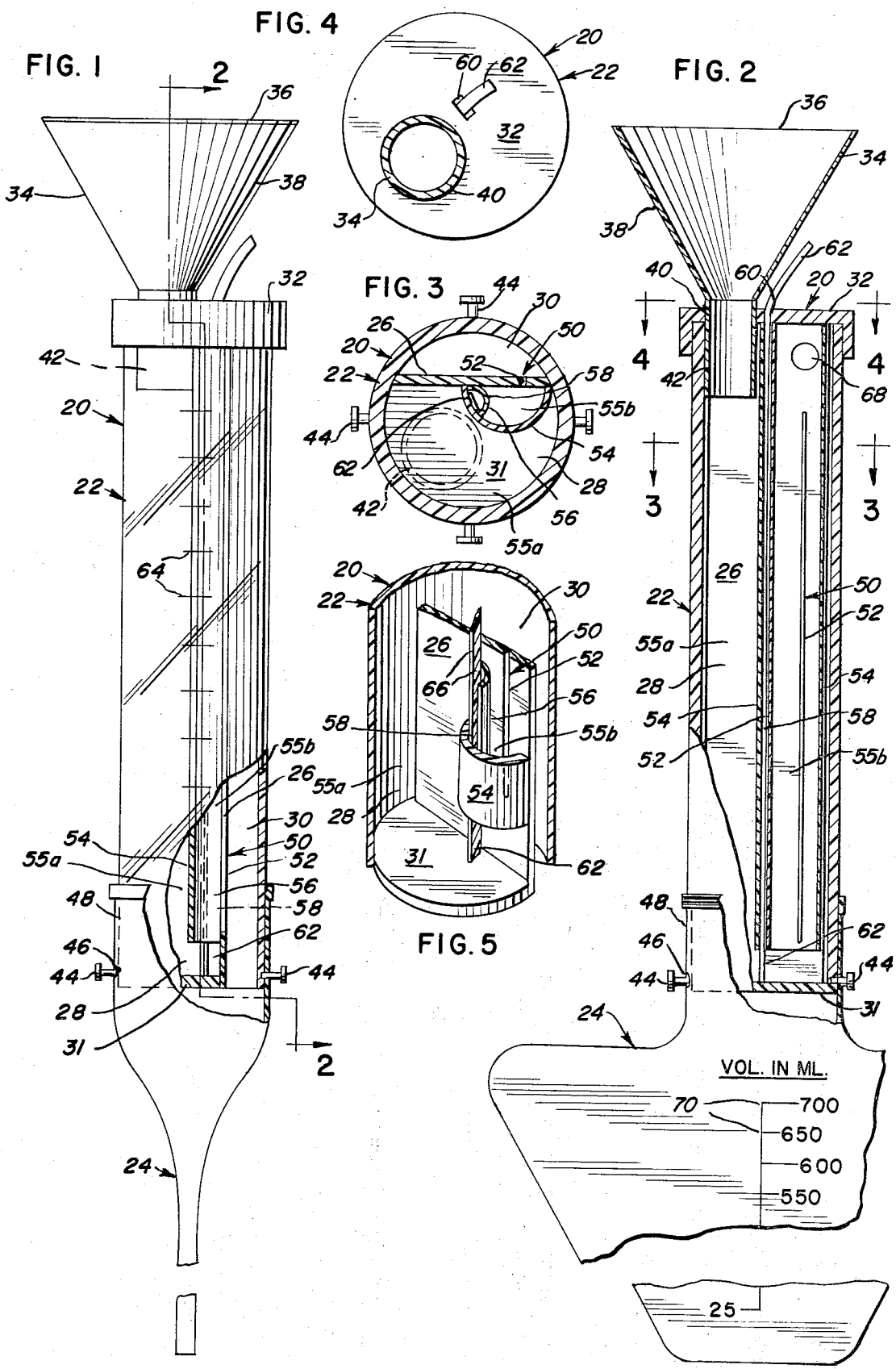

FLOW MEASURING APPARATUS

CROSS-REFERENCE TO RELATED APPLICATIONS

"Flow Measuring Device," Ser. No. 360,217, filed May 14, 1973, invented by Anthony J. Ciarico, and assigned to the assignee of the present application; "Apparatus for Measuring a Liquid Discharge," Ser. No. 360,218, filed May 14, 1973, invented by the applicants of the present application, and assigned to the assignee of the present application; "Time Measuring Device," Ser. No. 360,213, filed May 14, 1973, now U.S. Pat. No. 3,831,446, invented by John F. Dye, one of the applicants of the present application, and assigned to the assignee of the present application; and "Flow Measuring Apparatus Having a Colorimetric Urine Indicator," Ser. No. 360,235, filed May 14, 1973, invented by Shu-Sing Cheng, and assigned to the assignee of the present application.

BACKGROUND OF THE INVENTION

1. Field of the Invention

This invention relates to a flow measuring apparatus, and more particularly to a device for measuring the peak flow rate of a liquid discharge.

2. Description of the Prior Art

In the past, it has been found desirable to obtain various data pertaining to a liquid discharge. In particular, it was discovered that many urological problems could be readily diagnosed by analyzing information obtained during the natural voiding of urine by patients. Presently, various types of devices are utilized to obtain data on the urine stream, such as total volume, average flow rate, force, velocity, and configuration of the stream.

Most of these devices have suffered from less than total reliability because they have required the presence of one or more observers while the patient is voiding. It is obvious that administration of such devices in this manner creates sufficient psychological difficulties for many of the patients to effect voiding. Consequently, if the patients void at all, the potentially erroneous data obtained may result in a false diagnosis and a loss of confidence in the device by the physician. A further complication arises from the fact that many of these devices are rather bulky, and somewhat difficult to use.

Lane, Jr. U.S. Pat. No. 3,499,327 discloses a device to divert the beginning and middle portions of the urine stream into separate chambers. Profy U.S. Pat. No. 3,561,427 relates to a device which collects urine in a plurality of rotating containers over a period of time. Coanda U.S. Pat. No. Re.26,964 shows a container which measures the volume of urine over a period of time. De Bella U.S. Pat. No. 3,362,400 discloses a device for measuring specific gravity and the volume of liquid collected over a period of time. The related applications "Flow Measuring Device" and "Apparatus for Measuring a Liquid Discharge" disclosed devices which measure the peak flow rate of a liquid discharge.

SUMMARY OF THE INVENTION

A principle feature of the present invention is the provision of an apparatus of simplified construction for measuring the approximate peak flow rate of a liquid discharge, and which may be self-administered by a patient.

The measuring apparatus of the present invention includes a hollow receptacle having an inlet port adjacent the upper end of the receptacle to receive the liquid discharge, and a compartment below the inlet port to receive the discharge which passes through the inlet port. The receptacle also has a channel adjacent the compartment, and an upright wall in the receptacle separating the compartment from the channel. The wall has opening means communicating between the compartment and channel to permit passage of liquid from the compartment to the channel as the liquid collects in the compartment. The receptacle includes means for indicating the maximum height of liquid collected in the compartment during the discharge. The liquid passes from the channel to a container for collection therein.

A feature of the invention is that the approximate peak flow rate of the liquid discharge into the body member may be determined by the indicating means.

Another feature of the invention is that the total volume of the discharge may be determined by indicia on the container.

Further features will become more fully apparent in the following description of the embodiments of this invention and from the appended claims.

DESCRIPTION OF THE DRAWINGS

In the drawings:

FIG. 1 is a fragmentary elevational view, partly broken away, of the flow measuring apparatus of the present invention;

FIG. 2 is a fragmentary elevational view, partly broken away, and taken partly in section substantially as indicated along the line 2—2 of FIG. 1;

FIG. 3 is a sectional view taken substantially as indicated along the line 3—3 of FIG. 2;

FIG. 4 is a sectional view taken substantially as indicated along the line 4—4 of FIG. 2; and FIG. 5 is a fragmentary perspective view of the lower internal structure of the flow measuring apparatus showing the lower portion of an upright wall, shield, flange, and indicating strip.

DESCRIPTION OF THE PREFERRED EMBODIMENTS

Referring now to FIGS. 1 and 2, there is shown an apparatus, generally designated 20, for measuring a discharge of liquid. The apparatus 20 includes a hollow receptacle designated generally 22 and a container or bag designated generally 24 removably secured to the receptacle 22. However, if desired, the container 24 may be made integral with the receptacle at its lower end. Preferably, the receptacle and container are made from a suitable transparent material, such as plastic.

As illustrated in FIGS. 1–3, and 5, the receptacle 22, which is preferably cylindrically shaped, has an upright wall 26 which extends laterally across the inside of the receptacle and which extends vertically the height of the receptacle. The upright wall 26 separates the inside of the receptacle 22 into a compartment 28 and a channel 30. The lower end of the compartment 28 is closed by a bottom wall 31, while a cap 32 covers the upper end of the receptacle 22. If desired, the cap 32 may be removably secured to the upper end of the receptacle to provide access to the inside of the receptacle.

As shown in FIG. 1, 2, and 4, the receptacle 22 has a funnel-shaped member 34 adjacent its upper end which defines an inlet port 36 to receive a liquid discharge, and which has a tapered portion 38 and a lower depending portion 42 to direct the discharge into the inside of the receptacle. The cap 32 has an aperture 40 to removably receive the lower depending portion 42 of the funnel-shaped member 34. The positional relationship of the funnel-shaped member 34 to the inside of the receptacle 22 is best shown in FIG. 3, where the lower depending portion 42 of the funnel-shaped member 34 is shown in phantom lines. As shown, the compartment 28 of the receptacle 22 is positioned below the depending portion 42 and the inlet port 36, such that liquid passes through the funnel-shaped member 34 into the compartment 28.

As shown in FIGS. 1–3, the receptacle 22 has a plurality of outwardly projecting bosses 44, and the container 24 has a plurality of corresponding apertures 46 in the sides of an upper tubular section 48 of the container 24. Thus, the lower end of the receptacle 22 may be inserted into the upper tubular section 48 of the container 24, and the bosses 44 are received in the apertures 46 to removably secure the container 24 to the lower end of the receptacle 22.

As illustrated in FIGS. 1–3, and 5, the upright wall 26 has opening means, generally designated 50, which preferably comprises a vertical slot 52 having parallel sides, communicating between the compartment 28 and the channel 30. Preferably, the slot 52 or opening means is spaced slightly from the lower end of the receptacle 22, as shown.

A shield 54 is secured to the upright wall 26 in the compartment 28. The shield 54 is spaced from and covers the slot 52, in order to prevent liquid which enters the compartment from splashing against the slot 52. The shield 54 is spaced from the lower end of the receptacle 22 or the bottom wall 31 to permit passage of liquid under the lower end of the shield 54 to the slot 52. The shield 54 extends vertically in the compartment 28 at least coextensive with the vertical length of the slot 52. However, the shield 54 preferably extends to the upper end of the upright wall 26 or compartment 28 to prevent the inadvertent passage of liquid over the top of the shield 54. Although, for convenience, the shield 54 is shown as a semi-cylinder, it is understood that the shield 54 may have any suitable shape which prevents splashing of incoming liquid against the slot 52, and the shield 54 may be secured to the side walls of the receptacle 22, rather than the upright wall 26 itself, if desired.

As shown, the shield 54 separates the compartment 28 into a first chamber 55a positioned to receive the discharge passing through the inlet port 36 and into a second chamber 55b which communicates with the first chamber 55a adjacent its lower end. It is readily apparent that the chambers 55a and b may be formed individually, such that they are separated by means other than a wall, i.e., other than the shield shown in the drawings, with a passageway communicating between the two chambers adjacent their lower ends. For example, the chambers 55a and b may be defined by separate tubes which are connected by a passageway adjacent their lower ends.

A flange 56 is secured to the shield 54 intermediate the shield 54 and the upright wall 26. The flange 56 is spaced from the lower end of the receptacle 22 or the bottom wall 31, and defines, with the shield 54, a vertical passageway 58. Preferably, the flange 56, as well as the shield 54, extends to the upper end of the receptacle, to prevent incoming liquid from entering the upper end of the passageway 58, whereas liquid is free to enter the passageway 58 through its lower end, since both the shield 54 and flange 56 are spaced from the lower end of the receptacle 22 in the compartment 28.

As shown in FIGS. 2 and 4, the cap 32 has an aperture 60 positioned above the upper end of the passageway 58 for insertion of an indicating strip 62 through the aperture 60 and into the passageway 58 from above. As illustrated in FIGS. 1–3, and 5, the indicating strip 62 is pushed downwardly through the passageway 58 until the bottom of the strip 62 is positioned adjacent the lower end of the receptacle 22, and the strip 62 preferably has a length corresponding to at least the height of the receptacle to facilitate insertion and removal of the strip. The indicating strip 62 is sensitive to contact by liquid, such as urine, and since liquid enters the passageway 58 through its lower end, the indicating strip 62 provides an indication of the maximum height liquid reaches in the passageway 58 and the compartment 28 during the liquid discharge. Any suitable wettable material may be utilized for the indicating strip 62, preferably one which is sensitive to contact by the liquid being measured, such as material which changes color upon contact by the liquid, for example, a methylene blue compound or rhodamine may be utilized on the strip 62 to obtain the color contrast desired. The strip 62 may be replaced after use of the apparatus, thus rendering the apparatus for further use, if desired.

In operation, the receptacle is positioned to receive a discharge of liquid, such as a urine stream during voiding, through the inlet port 36. As the liquid discharge passes into the receptacle through the inlet port 36, the tapered portion 38 and depending portion 42 direct the discharge into the compartment 28. As the discharge continues, the liquid collects in the lower part of the compartment 28 until it reaches the height of the lower end of the slot 52, and once the height of the liquid in the compartment 28 further rises, the liquid begins to pass through the lower end of the slot 52 into the channel 30. The liquid then drains through the lower end of the channel 30 into the container 24 for collection.

For a given rate of flow of the discharge into the receptacle the liquid attains a fixed height in the compartment 28, and the liquid passes at a fixed rate of flow through the slot 52. Hence, if the rate of flow of the liquid discharge into the receptacle increases, the height of liquid in the compartment raises an additional amount, and the rate of flow through the slot 52 also increases, since the liquid flows through a larger vertical portion of the slot 52. Thus, as long as the rate of flow of the discharge into the receptacle increases, the height of liquid in the compartment 28 continues to raise, and the rate of flow of liquid through the slot 52 also increases. When the flow rate of the incoming discharge abates, the liquid drains from the compartment 28 into the channel 30 faster than it enters the compartment, and the height of the liquid in the compartment begins to subside.

Peak flow rate of the incoming liquid discharge may be defined as the maximum rate of flow of the discharge. Since the height of liquid in the compartment raises or lowers responsive to an increase or decrease, respectively, of the flow rate of the incoming discharge, it is apparent that the maximum height of liquid attained in the compartment during the discharge serves as an indication of the approximate peak flow rate of the discharge. Although anomalies in the discharge, such as a momentary surge of the discharge, may not be ultimately reflected in the maximum liquid height in the compartment, due, in part to the lag between the time the discharge enters the receptacle and the time it enters the compartment, the apparatus determines the peak flow rate with sufficient accuracy for such purposes as are under discussion. In particular, a urine stream during voiding has a relatively slow rate of change of flow rate, and apparatus of the present invention indicates a peak flow rate for the discharge which is sufficiently accurate for purposes of diagnosing a patient.

It is possible that the approximate peak flow rate of the urine discharge may be determined by observing the highest level of liquid accumulated in the compartment 28 during the discharge. Direct reading by the patient may be impractical or difficult during self-administration of the apparatus as thus far described, if the apparatus is utilized to collect a discharge of liquid during voiding, and it is desirable that the apparatus be self-administered by the patient in order to alleviate any psychological problems of the patient which might be caused by observation of the receptacle during voiding.

Accordingly, the indicating means, comprising a wall portion defined by the shield 54 and flange 56 and the indicating strip 62, has been provided to automatically record the approximate maximum height of liquid collected in the compartment 28 during the liquid discharge. Since liquid in the compartment 28 passes into the lower end of the passageway 58, the maximum liquid height attained in the compartment 28 during the liquid discharge is also proportionately reached in the passageway 58, which is indicated by a color contrast on the indicating strip 62. After the liquid discharge has been completed, a direct reading of the approximate peak flow rate may be determined by indicia 64 on the receptacle, as shown in FIG. 1, or by indicia 66 on the indicating strip 62 itself, as shown in FIG. 5.

It is apparent that the rate of drainage from the compartment 28 into the channel 30 is partly dependent upon the precise structure of the receptacle 22. For example, although the opening means 50 is shown as a vertical slot 52 having parallel sides, it is contemplated that the slot may be widened or narrowed at desired vertical positions to increase or decrease the flow rate of liquid through the wall 26 in that area, and the wall 26 may have a plurality of slots if desired. Also, the cross sectional area of the compartment 28 itself may be selected of a suitable size to provide the desired sensitivity of liquid column height for a more accurate determination of the peak flow rate.

It is contemplated that a particular structure for the receptacle would first be established, dependent on the accuracy desired and the expected range of values for the peak flow rate of the liquid discharge. Next the receptacle could be calibrated against known constant flow rates of a discharge passing into the receptacle to determine the appropriate location for the indicia 64 or 66 on the receptacle or the strip. That this may be readily accomplished is apparent from the fact that the peak flow rate for a discharge having a constant flow rate is the value of the constant flow rate itself. Accordingly, when the discharge of constant flow rate is directed into the receptacle, liquid rises in the compartment to a level at which liquid entering the compartment is offset by the liquid draining from the compartment into the channel, and the receptacle is marked at this height for peak flow rate by the value of the flow rate of the constant discharge.

Although the passageway 58 is shown as being located intermediate the shield 56 and the upright wall 26, it is apparent that the passageway could be located at various other positions in the compartment 28. For example, the passageway could be located on the outside of the shield 54, relative the wall 26, or on the inside of the side wall of the receptacle 22 in the compartment 28. However, the indicating strip 62 should remain protected from premature contact by the incoming liquid into the compartment, while liquid should be permitted to pass into the lower end of the passageway, as discussed above.

In the event that the rate of flow of the incoming discharge is sufficiently abnormal, such that its flow rate greatly exceeds the value which has been expected, an enlarged opening 68 is provided in the upright wall 26 adjacent its upper end for rapid passage of liquid from the compartment 28 into the channel 30. Thus, overflow of the liquid out of the receptacle is prevented. The indicating strip 62 will provide an indication that the incoming discharge is abnormally high and that an overflow condition has occurred, since the indicating strip will change color contrast to a vertical height corresponding to the opening 68.

As noted above, once the rate of flow of the liquid discharge into the receptacle abates, the height of the liquid in the compartment 28 subsides, and the approximate peak flow rate has already been determined on the indicating means. During the remainder of the liquid discharge, the liquid continues to drain from the compartment 28 into the channel 30 until the discharge is terminated and drainage from the compartment to the channel eventually stops. Since the liquid drains from the channel 30 of the receptacle 22 into the container 24, the volume of liquid which collects in the container 24 during the liquid dischrage may readily be determined by indicia 70 on the container 24, as shown in FIG. 2. If the lower end of the slot 52 is spaced above the bottom wall 31 of the receptacle and some liquid remains in the compartment 28 after drainage from the compartment has been completed, the calibration of volume measurements on the container 24 may be adjusted to take into account a constant volume of residual liquid which remains in the compartment 28 after the discharge has been completed.

Since the patient may use the device without observation, unnatural voiding or failure to void which normally occur from psychological difficulties when a patient voids under observation are prevented. After voiding, the patient merely summons the physician or nurse, who first determines the peak flow rate and the total volume of the liquid discharge as indicated by the respective indicia on the receptacle and container. If it is desired to reuse the measuring apparatus 20, the cap 32 may be removed from the receptacle 22, and any residual liquid remaining in the compartment 28 may be removed. Also, the container 24 may be removed from the receptacle 22 for disposal of the liquid in the container or for taking a specimen.

We claim:

1. An apparatus for measuring the approximate peak flow rate of a liquid discharge comprising, a hollow receptacle having an inlet port adjacent the upper end of the receptacle to receive the liquid discharge, a compartment below the inlet port to receive the discharge passing through the inlet port, a channel adjacent said compartment, and an upright wall in the receptacle separating the compartment from the channel, said wall having vertically disposed opening means communicating between the compartment and channel to permit passage of liquid from the compartment to the channel as the liquid collects in the compartment, wettable means for indicating the maximum height of liquid collected in the compartment during the discharge to determine the approximate peak flow rate of the liquid discharge, and means for preventing the incoming liquid discharge from directly contacting a substantial portion of the indicating means.

2. The measuring apparatus of claim 1 wherein said opening means comprises a vertical slot in said upright wall.

3. The measuring apparatus of claim 2 including a shield in said compartment spaced from and covering said slot to prevent liquid entering the compartment from splashing against the slot, said shield being spaced from the lower end of the receptacle to permit passage of liquid under the lower edge of the shield to the slot.

4. An apparatus for measuring the approximate peak flow rate of a liquid discharge comprising, a hollow receptacle having an inlet port adjacent the upper end of the receptacle to receive the liquid discharge, a compartment below the inlet port to receive the discharge passing through the inlet port, a channel adjacent said compartment, and an upright wall in the receptacle separating the compartment from the channel, said wall having a vertical slot communicating between the compartment and channel to permit passage of liquid from the compartment to the channel as the liquid collects in the compartment, a shield in said compartment spaced from and covering said slot to prevent liquid entering the compartment from splashing against the slot, said shield being spaced from the lower end of the receptacle to permit passage of liquid under the lower end of the shield to the slot, and means for indicating the maximum height of liquid collected in the compartment during the discharge to determine the approximate peak flow rate of the liquid discharge, said indicating means comprising, a flange secured to said shield intermediate the shield and the upright wall, said flange being spaced from the lower end of the receptacle and defining a vertical passageway communicating with the compartment adjacent the lower end of the flange, and an indicating strip removably positioned in said passageway.

5. The measuring apparatus of claim 3 wherein said shield extends vertically in the compartment at least coextensive with the slot.

6. The measuring apparatus of claim 3 wherein said shield extends from adjacent the lower end of the receptacle to the upper end of said upright wall.

7. The measuring apparatus of claim 3 wherein said shield comprises a semi-cylinder secured to the upright wall.

8. An apparatus for measuring the approximate peak flow rate of a liquid discharge comprising, a hollow receptacle having an inlet port adjacent the upper end of the receptacle to receive the liquid discharge, a compartment below the inlet port to receive the discharge passing through the inlet port, a channel adjacent said compartment, and an upright wall in the receptacle separating the compartment from the channel, said wall having opening means communicating between the compartment and channel to permit passage of liquid from the compartment to the channel as the liquid collects in the compartment, and means for indicating the maximum height of liquid collected in the compartment during the discharge to determine the approximate peak flow rate of the liquid discharge, said indicating means comprising, a wall section in the receptacle defining a vertical passageway communicating with said compartment adjacent the lower end of the receptacle, and an indicating strip removably positioned in said passageway.

9. The measuring apparatus of claim 8 including indicia on said indicating strip indicating the peak flow rate of the liquid discharge.

10. The measuring apparatus of claim 1 including indicia on said receptacle indicating the peak flow rate of the liquid discharge based on said indicating means.

11. The measuring apparatus of claim 1 wherein said receptacle includes a generally funnel-shaped member adjacent the upper end of the receptacle and defining said inlet port for directing the liquid discharge into said compartment.

12. The measuring apparatus of claim 11 wherein said receptacle includes a cap adjacent its upper end for covering the receptacle, with said cap having an aperture above the compartment for removably receiving said funnel-shaped member.

13. The measuring apparatus of claim 1 including an opening adjacent the upper end of the upright wall above said opening means to prevent overflow of liquid from the receptacle.

14. The measuring apparatus of claim 1 wherein said receptacle has a cylindrical shape.

15. The measuring apparatus of claim 14 wherein said upright wall extends laterally across the inside of said receptacle.

16. The measuring apparatus of claim 1 including means for shielding the opening means from liquid passing through the inlet port into said compartment.

17. The measuring apparatus of claim 1 wherein said compartment comprises, a first chamber positioned to receive liquid passing through the inlet port, and a second chamber communicating with the opening means and with the first chamber adjacent the lower ends of the first and second chambers.

18. The measuring apparatus of claim 1 including a container below the receptacle communicating with said channel for passage of liquid from the channel to the container and collection therein.

19. The measuring apparatus of claim 18 including indicia on the container indicating the volume of liquid collected in the container.

20. The measuring apparatus of claim 18 wherein said container is removably secured to the lower end of the receptacle.

21. The measuring apparatus of claim 1 wherein said receptacle includes a tapered portion adjacent the upper end of the receptacle defining the inlet port.

22. The measuring apparatus of claim 17 wherein the indicating means is located in said second chamber.

23. An apparatus for measuring the approximate peak flow rate of a liquid discharge comprising, a hollow receptacle having an inlet port adjacent the upper end of the receptacle to receive the liquid discharge, a compartment below the inlet port to receive the discharge passing through the inlet port, a channel adjacent said compartment, and an upright wall in the receptacle separating the compartment from the channel, said wall having vertically disposed opening means communicating between the compartment and channel to permit passage of liquid from the compartment to the channel as the liquid collects in the compartment, at least a portion of said opening means being located adjacent the lower end of said compartment, an indicating strip received in the receptacle for indicating the maximum height of liquid collected in the compartment during the discharge to determine the approximate peak flow rate of the liquid discharge, and means for preventing the incoming discharge from contacting a substantial upper portion of the strip prior to accumulation of the discharge in the lower part of the compartment.

* * * * *